United States Patent Office 2,998,295
Patented Aug. 29, 1961

2,998,295
PROCESS FOR THE IMPROVEMENT OF SHAPED THERMOPLASTIC MATERIALS CONTAINING CARBONAMIDE GROUPS
Karl Goldann, Dusseldorf, Germany, assignor to Bohme Fettchemie G.m.b.H., Dusseldorf, Germany, a corporation of Germany
No Drawing. Filed Aug. 5, 1957, Ser. No. 676,399
Claims priority, application Germany Aug. 8, 1956
8 Claims. (Cl. 8—115.5)

This invention relates to a process of improving the physical and chemical properties of shaped thermoplastic materials containing CO.NH groups, and more particularly to a method of improving the properties of such materials by hydroxy-alkylation.

Thermoplastic synthetic materials which contain acid amide groups have heretofore been treated with alkylene oxides to improve certain of their properties; for example, by allowing the thermoplastic synthetic materials to swell in admixture with an alkylene oxide, and subsequently heating the mixture while introducing additional amounts of alkylene oxide. However, the modified materials obtained thereby are gel-like to oily in consistency and are therefore not capable of retaining a predetermined shape of any kind. Thus, synthetics treated in this manner become virtually useless as shapeable thermoplastic materials without further modification.

It is also known to treat polyamide fibers with large quantities of alkylene oxide, whereby flexible products are obtained. This treatment produces a substantial change in the original polyamide fiber structure and thereby imparts the fiber with modified properties which are especially adapted to special purposes of use, but which are unsuitable for customary uses in the textile field.

It is an object of the present invention to provide a process for the treatment of shaped thermoplastic synthetic materials which improves their physical and chemical properties but does not alter their shape or their capability to retain that shape.

Other objects and advantages of the present invention will become apparent as the description proceeds.

I have found that the above object is attained if shaped materials containing CO.NH groups are reacted with small amounts of hydroxy-alkylating agents.

The term "shaped thermoplastic materials containing CO.NH groups" is understood to include primarily the known condensation products formed from dicarboxylic acids and diamines or from caprolactam, as well as the condensation products formed from diisocyanates and diamines or diols. For the hydroxy-alkylation, primarily the known alkylene oxides, such as ethylene oxide and propylene oxide, may be employed. In addition, glycide, glycide acids, halogen hydrins, such as ethylene monochlorohydrin, glycerin monochlorohydrin, epichlorohydrin, propylene monochlorohydrin, diethyleneglycol monochlorohydrin, and the like, may be used as the hydroxy-alkylating agent.

The hydroxy-alkylation effects a substantial improvement in certain physical and/or chemical properties of the shaped thermoplastic materials. These materials become hydrophilic, are imparted with antistatic properties and with an improved affinity for dyes, without undergoing any substantial change in their basic mechanical or structural properties, such as resistance to tearing, tensile strength, resistance to cracking, melting point, and the like. The shaped thermoplastic materials may be provided for the above treatment in all known forms; that is, in the form of fibers, threads, flakes, foils, films, hoses, tubes, blocks or also in the form of corresponding finished products, such as spun fabrics, knitted fabrics, woven fabrics, sheathings, coatings, painted surfaces, and the like. The shaped thermoplastic materials may also be admixed with suitable additives, such as other shapable substrates, fillers, pigments, and the like.

The process in accordance with the present invention is advantageously carried out by treating the shaped thermoplastic materials with the hydroxy-alkylating agent at room temperature or elevated temperatures in the presence of catalysts; the process may be practiced at atmospheric or superatmospheric pressures and, if desired, also in the presence of inert solvents.

A preferred method comprises reacting the shaped thermoplastic materials, for example shaped materials made from polyamide condensates, with gaseous ethylene oxide in the presence of sodium hydroxide as a catalyst, at atmospheric or superatmospheric pressure, at temperatures above 50° C., preferably at temperatures from 80–100° C., and in the presence or absence of inert solvents. For this purpose the shaped thermoplastic materials, such as polyamide fibers or woven fabrics produced therewith, may first be impregnated with dilute sodium hydroxide and thereafter gaseous ethylene oxide is reacted with the impregnated material in a reaction chamber at the indicated temperatures. The shaped material, pretreated with the catalyst, may also be soaked in an inert solvent, or the treatment may altogether be carried out in an inert solvent. In the latter case, the solvent or a suitable solvent mixture is chosen so that it boils at the desired reaction temperature, whereby a thorough intermixing between solvent or solvent mixture and the ethylene oxide is achieved. In accordance with a further embodiment, it is also possible to treat the shaped materials with liquid ethylene oxide or ethylene oxide diluted with a solvent; this method may also be practiced at lower temperatures than those indicated above.

The inert solvents which may be used in practicing the present process include aromatic hydrocarbons, such as benzene, toluene and xylene, or aliphatic hydrocarbons, such as benzine, as well as dioxan, tetrahydronaphthalene, decahydronaphthalene, ether, water, and the like. In addition to sodium hydroxide, other known catalysts suitable for the hydroxy-ethylation with ethylene oxide may be used, such as alcoholates, alkali earth metal hydroxide, quaternary ammonium compounds, and the like.

The quantities of ethylene oxide which react in the present process are very small. As a rule, however, the process is carried out with an excess of alkylene oxide. The reacted quantities of ethylene oxide may range between about 0.01 and 2% by weight, based on the weight of shaped thermoplastic material present. Larger amounts of ethylene oxide may also be used, but these amounts should, as a rule, not exceed 10% by weight. The other suitable hydroxy-alkylating agents enumerated above are used in smaller quantitative ratios.

Subsequent to the hydroxy-alkylating treatment, the polyamide fiber material is, if required, freed from adhering solvent, washed and dried. The modified material exhibits no substantial changes in shape and possesses substantially the same mechanical properties as the thermoplastic starting material. Moreover, it exhibits no substantial changes in color so that it is difficult to distinguish from the starting material used. The ethylene oxide absorbed by the fiber cannot be removed with customary cleansing agents, for example by repeated laundering, but instead is permanently chemically bound.

The thermoplastic materials treated with the hydroxy-alkylating agents in accordance with the present invention may be further improved with respect to certain of their properties by reacting the same with compounds which combine with the hydroxyl groups of the hydroxy-alkyl radicals formed by the hydroxy-alkylation. For this purpose, inorganic or organic acids, especially anhydries or also acid chlorides, may be used, such as phosphorus pentoxide, acetic acid anhydride, and the like. When phosphorus pentoxide is used to combine with the hydroxyl groups, an increase in the antistatic effects of the hydroxy-alkylated thermoplastic material is achieved; when acetic acid anhydride is used a control of the hydrophilic properties of the material is provided. If the hydroxy-alkyl radicals contain additional functional groups, such as halogen, carboxyl groups, etc., radicals such as alkyl radicals, ester groups, etc., may be introduced into the thermoplastic material molecule through these groups, which further modify the properties of the thermoplastic synthetic.

The following examples will further illustrate the present invention and enable others skilled in the art to understand my inveniton more completely. It is understood, however, that the examples below are given only as illustrations and are not intended to limit the scope of the invention.

Example I 10 parts by weight of polyamide staple fiber, produced from adipic acid and hexamethylenediamine, were impregnated with a 3% methanolic sodium hydroxide solution and were then placed into an autoclave containing 300 parts by volume toluene as an inert solvent. In place of the methanolic sodium hydroxide solution, solid sodium methylate may also be used. Thereafter, nitrogen gas was introduced into the autoclave and the contents thereof were heated to 90° C. Subsequently, 50 parts by weight ethylene oxide were forced into the autoclave over a period of 2 hours, and at end of this period the temperature was maintained at 90° C. for an additional 2 hours. After allowing the contents of the autoclave to cool, the fiber material was removed from the autoclave, freed from solvent, washed and dried. The dry modified fiber exhibited virtually no change in weight over the original fiber. The modified fiber was light in color and hydrophilic. The electrical resistance of the fiber prior to the above hydroxy-ethylating treatment was $10,000 \times 10^9$ ohms and after the treatment it was $35 \times 10^9$ ohms; thus, the modified material was antistatic. After laundering the treated fiber four times with a commercial fatty alcohol sulfonate detergent, the staple fiber still had an electrical resistance of $130 \times 10^9$ ohms, which indicated that its antistatic properties were resistant to washing.

Example II 10 parts by weight of a polyamide woven fabric, for example taffeta produced from caprolactam, were impregnated with a methanolic sodium hydroxide solution as in Example I, and thereafter treated with ethylene oxide under the conditions stated in Example I, except in the presence of dioxan as the inert solvent instead of toluene. The properties of the hydroxy-ethylated fabric after laundering corresponded approximately to those of the modified staple fiber produced in accordance with Example I. The electrical resistance of the treated fabric was about $12 \times 10^9$ ohms, while that of the untreated starting material was $10,000 \times 10^9$ ohms. The rate of wetting of the fabric by distilled water was substantially increased by the above treatment; thus, the hydrophilic properties of the treated material had been substantially improved. Prior to the above treatment, the wetting rate was 51 seconds and subsequent to the treatment it was 20 seconds.

Example III 10 parts by weight of polyamide film material, produced from adipic acid and tetramethylenediamine, were moistened with a methanolic sodium hydroxide solution and placed into a reaction vessel which contained 1000 parts by volume of toluene as an inert solvent. The toluene was heated to about 80° C. and thereafter a stream of gaseous ethylene oxide was slowly passed therethrough over 3 to 4 hours. At the end of this period, the film material was passed through a pair of squeeze-rollers to remove excess solvent, washed and dried. A polyamide film with improved antistatic properties was obtained.

Example IV 5 parts by weight of a hydroxy-ethylated polymerized caprolactam fiber obtained in accordance with the procedure of Example I were heated with 3 parts by weight phosphorus pentoxide for 2 hours at 40° C. in the presence of 150 cc. methylene chloride. Thereafter, the fiber was squeezed, repeatedly washed, first with ethanol and then with a commercial high-grade washing agent (2 gm. per liter, 30 minutes, 40° C., solution ratio 1:50), and then repeatedly rinsed with water and dried. After conditioning the dried fiber in a climate chamber (65% relative humidity), the electrical resistance of the modified fiber was $27 \times 10^9$ ohms, whereas the electrical resistance of the merely hydroxy-ethylated fiber was $350 \times 10^9$ ohms.

Example V 10 parts by weight of a polyamide yarn were treated with ethylene oxide as in Example III. The pretreated yarn was then dyed in the customary blue fashion with a customary dyestuff for polamide yarns, using 3% dye and 3% acetic acid (30% solution) based on the weight of yarn. For the purpose of comparison, untreated polyamide yarn was dyed in an analogous fashion. The hydroxy-ethylated yarn assumed a considerably deeper, more saturated color tone than the untreated yarn. Consequently, the hydroxy-ethyl groups introduced by the hydroxy-ethylation into the polyamide fiber produced a substantially improved affinity of the yarn for the dye.

Example VI 10 parts by weight polyamide staple fiber were impregnated with a 20% aqueous sodium hydroxide solution. The impregnated fiber was squeeze-dried, placed into a solution of 20 gm. epichlorohydrin in 180 cc. toluene and allowed to remain therein for 90 minutes at 30–40° C. Subsequently, the fiber was squeeze-dried, washed repeatedly with ethanol, water and a commercial high-grade washing agent and finally rinsed with distilled water and dried. The electrical resistance of the treated fiber was $160 \times 10^9$ ohms, whereas the electrical resistance of the unterated fiber was $10,000 \times 10^9$ ohms. When the treated fiber was placed for 1 hour into a 5% methanolic sodium hydroxide solution at 25° C. and subsequently washed as above described, the material had an electrical resistance of $31 \times 10^9$ ohms.

Example VII 10 parts by weight polyurethane staple fiber, produced from 1,6-hexanediisocyanate and butylene glycol, where impregnated with a 20% aqueous sodium hydroxide solution, squeeze-dried, allowed to lie for about 30 minutes, and were then placed into a solution of 50 gm. ethylene monochlorohydrin in 200 cc. water. Thereafter, the solution was heated for 1 hour at 70° C. Subsequently, the fiber material was removed from the solution and washed and dried as described in Example VI. The electrical resistance of the treated fiber was $140 \times 10^9$ ohms, whereas the untreated fiber had an electrical resistance of $10,000 \times 10^9$ ohms. After laundering the treated fiber three times in a commercial high-grade washing agent (2 gm. per liter, 30 minutes, 40° C., solution ratio 1:50), rinsing and drying, the modified fiber had an electrical resistance of $120 \times 10^9$ ohms.

In the above quoted examples the washing step after the hydroxy-alkylating treatment was performed by an anion-active substance being resistant to salts causing hardness, such as higher molecular alkyl sulfates, alkyl sulfonates, alkyl benzene sulfonates, alkyl phosphates and the like. The best washing agents for these purposes are the sodium salts of the acid alkyl sulfates as dodecyl sodium sulfate, oleyl sodium sulfate, and alkyl sodium sulfate mixture having alkyl radicals of $C_{12}$–$C_{18}$ and the sodium tetrapropyl benzene sulfonate.

While I have illustrated certain specific embodiments of my invention, it will be apparent to those skilled in the art that the present invention is not limited to these embodiments, and that various changes and modifications may be made without departing from the spirit of the invention or the scope of the appended claims.

I claim:

1. The process of improving the properties of thermoplastically shaped textile materials selected from the group consisting of fibers, threads, foils and the fabrics produced from the same, said thermoplastically shaped textile materials being thermoplastically shaped from polymers containing interlinear —CO.NH— groups selected from the group consisting of polyamides formed from dicarboxylic acids and diamines, polyamides formed from caprolactam and polyurethanes formed from 1,6-hexanediisocyanate and butylene glycol, which comprises reacting said thermoplastically shaped textile materials with a hydroxy-alkylating agent selected from the group consisting of lower alkylene oxides, glycide and lower alkylene halogenhydrins in the presence of an alkaline reacting alkylating catalyst at a temperature from about 50° C. to 90° C. for a time between about 1 hour to 4 hours and sufficient to add from 0.01 to 2% by weight of said hydroxy-alkylating agent to said interlinear —CO.NH— groups in said thermoplastically shaped textile materials, interrupting the reaction when the amount of said hydroxy-alkylating agent added falls within said range, and recovering said thermoplastically shaped textile materials from said reaction in the form of their original thermoplastically shaped structure.

2. Process of claim 1 wherein said hydroxy-alkylating agent is ethylene oxide.

3. Process of claim 1 wherein said hydroxy-alkylating agent is a lower alkylene halogenhydrin.

4. The process of improving the properties of thermoplastically shaped textile materials selected from the group consisting of fibers, threads, foils and the fabrics produced from the same, said thermoplastically shaped textile materials being thermoplastically shaped from polymers containing interlinear —CO.NH— groups selected from the group consisting of polyamides formed from dicarboxylic acids and diamines, polyamides formed from caprolactam and polyurethanes formed from 1,6-hexanediisocyanate and butylene glycol, which comprises reacting said thermoplastically shaped textile materials with a hydroxy-alkylating agent selected from the group consisting of lower alkylene oxides, glycide and lower alkylene halogen-hydrins in the presence of an alkaline reacting alkylating catalyst at a temperature from about 50° C. to 90° C. for a time between about 1 hour and about 4 hours and sufficient to add from 0.01 to 2% by weight of said hydroxy-alkylating agent to said interlinear —CO.NH— groups in said thermoplastically shaped textile materials, interrupting the reaction when the amount of said hydroxy-alkylating agent added falls within said range, recovering said thermoplastically shaped textile materials from said reaction in the form of their original thermoplastically shaped structure, and washing said reacted thermoplastically shaped polymers in the presence of an anionic active substance being resistant to salts causing hardness.

5. The process according to claim 1 wherein the condensation reaction is carried out at elevated pressures.

6. The process according to claim 1 wherein the condensation reaction is carried out in the presence of an inert solvent.

7. The process of improving the properties of thermoplastically shaped textile fibers, said fibers being thermoplastically shaped from polymers containing interlinear —CO.NH— groups selected from the group consisting of polyamides formed from dicarboxylic acids and diamines, polyamides formed from caprolactam and polyurethanes formed from 1,6-hexanediisocyanate and butylene glycol, which comprises reacting said thermoplastically shaped fibers with ethylene oxide in the presence of an alkaline reacting alkylating catalyst at a temperature from about 80° C. to 90° C. and at elevated pressures for a time between about 1 hour and 4 hours and sufficient to add from 0.01 to 2% by weight of ethylene oxide to said interlinear —CO.NH— groups in said thermoplastically shaped textile fibers, interrupting the reaction when the amount of said ethylene oxide added falls within said range, removing said thermoplastically shaped textile fibers from said reaction and recovering said thermoplastically shaped textile fibers in their original thermoplastically shaped structure.

8. The process of claim 7 wherein said thermoplastically shaped textile fibers are thermoplastically shaped from polyamide polymers formed from dicarboxylic acids and diamines.

References Cited in the file of this patent

UNITED STATES PATENTS

| 2,631,993 | Morgan | Mar. 17, 1953 |
| 2,652,388 | De Groote | Sept. 15, 1953 |
| 2,835,653 | Haas et al. | May 20, 1958 |

FOREIGN PATENTS

| 529,729 | Canada | Aug. 28, 1956 |

OTHER REFERENCES

Ser. No. 323,512, Hagedorn (A.P.C.), published Apr. 20, 1943.

Ser. No. 393,282, Hopff et al. (A.P.C.), published Apr. 20, 1943.

Haas et al.: Jour. of Polymer Science, vol. 15, pp. 427 to 446 (February 1955).